Dec. 14, 1965    J. S. KIES    3,223,102
ELECTRO-PNEUMATIC TRANSDUCER
Filed Sept. 10, 1962    3 Sheets-Sheet 1

INVENTOR
Joseph S. Kies

BY *Herbert M. Birch*
ATTORNEY

Dec. 14, 1965  J. S. KIES  3,223,102
ELECTRO-PNEUMATIC TRANSDUCER
Filed Sept. 10, 1962  3 Sheets-Sheet 2

INVENTOR
Joseph S. Kies
BY Herbert M. Birch
ATTORNEY

Dec. 14, 1965    J. S. KIES    3,223,102
ELECTRO-PNEUMATIC TRANSDUCER
Filed Sept. 10, 1962    3 Sheets-Sheet 3

INVENTOR
Joseph S. Kies
BY Herbert M. Birch
ATTORNEY

United States Patent Office 3,223,102
Patented Dec. 14, 1965

3,223,102
ELECTRO-PNEUMATIC TRANSDUCER
Joseph S. Kies, Goshen, Ind., assignor to Robertshaw Controls Company, Richmond, Va., a corporation of Delaware
Filed Sept. 10, 1962, Ser. No. 222,435
8 Claims. (Cl. 137—82)

The present invention relates generally to electric-pneumatic transducers and more particularly to such devices wherein the primary element is an electrical measuring means in the form of a torque motor, such for example as a galvanometer which is arranged to sense a condition and communicate the same to a controlling means consisting of a pneumatic relay adapted to apply power for operating a motor or the like by output branch line pressure in accordance with the proportional modulation of said output pressure by the flapper or vane actuated by the primary element.

An object of this invention is to provide in an electric-pneumatic transducer, an electric measuring means of extremely simple, economical and readily available form for proportional modulation of the power output pressure of the pneumatic relay of the transducer controlling means according to an electrically sensed condition of the transducer measuring means.

Another object is to provide in an electric-pneumatic transducer, a controlling means for a motor or the like, said means including a pneumatic relay of extremely simple, economical and readily available form, which is responsive to and proportionally modulated by the electrical primary element of the transducer and which relay is comprised of separable and replaceable elements which are easily cleaned and replaceable.

The above and other objects and advantages of the present invention will appear more fully hereinafter from a consideration of the detailed description which follows, taken with the accompanying drawings wherein one embodiment of the invention is illustrated. It is to be expressly understood, however, that the drawings are for the purpose of illustration only and are not intended as a definition of the limits of the invention.

In the drawings, wherein like reference characters refer to like parts throughout the several views.

Figure 1:
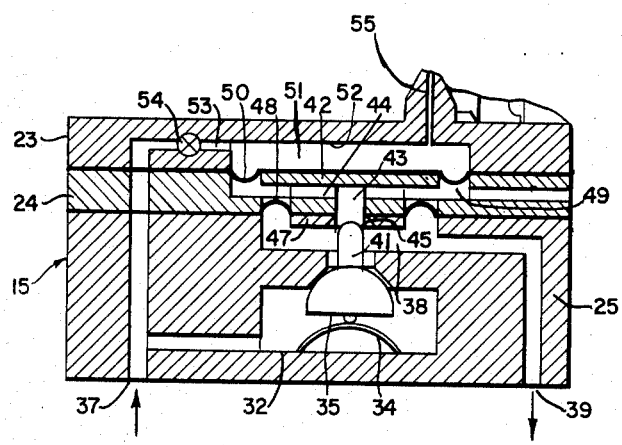
FIGURE 1 is a schematic diagram of the invention in cross section of a pneumatic relay with which an electric motor in the form of a galvanometer is to be operatively associated for actuating a leakport lever secured to the moving coil of the galvanometer for proportional modulation of the branch pressure of the relay.
Figure 5:
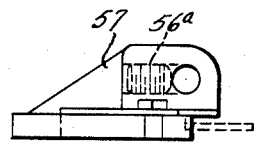
FIGURE 5 is a top view in elevation of the leakport bushing supporting bracket mounted adjacent the electric measuring means of the transducer shown in FIGURES 2 and 3.

Referring in detail to the drawings and first with particular reference to FIGURES 1, 2, 6 and 7, the device combines a miniature torque motor 10, which is similar to a moving coil galvanometer comprising a moving coil 11 movable between the poles of a magnet 12. The coil 11 has a U-shaped arm 13 suitably secured thereto at one leg thereof, while the opposite leg is free to oscillate with the movements of the coil 11 and is formed on the free end thereof with a vane 14, which serves as a valve means to proportionally modulate the pressure in the branch line of a pneumatic relay 15.

The torque motor 10 is supported on a mounting base 17 having a flange 18 and a reduced cylindrical portion 19 adapted to fit and seat in the end of the bore 20 of a cylindrical collar 22, screws 21 being used to secure the same in the collar bore. This collar is formed integrally with the top element 23 of the pneumatic relay 15 and provides for operatively supporting and positioning the coacting transducer elements for operative connection. The electric portion of the transducer depends from the base 17 into the bore of the collar 22 to a position, whereby the valve or vane 14 is movable to and from the leakport of the pneumatic relay 15.

Figure 4:
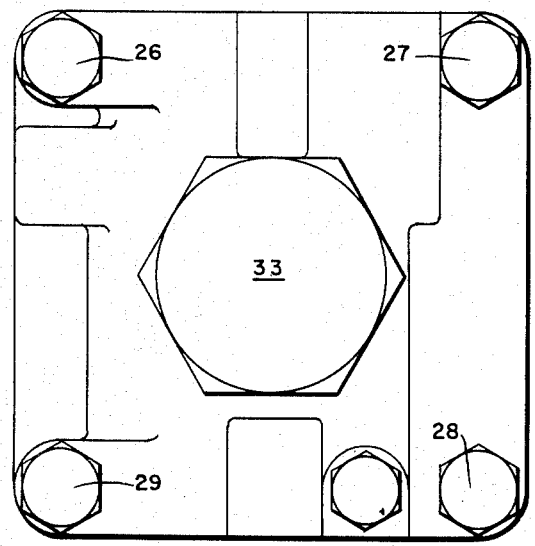
FIGURE 4 is an end view of the pneumatic relay end of the unit casing.
Figure 7:
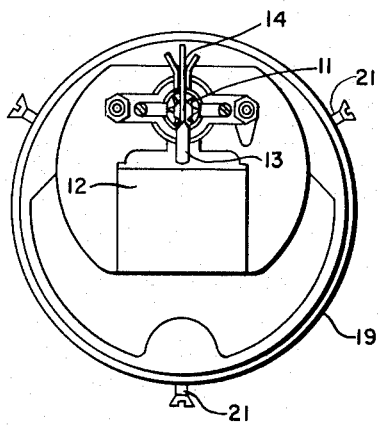
FIGURE 7 is a front view of the disclosure of FIGURE 6.

The relay 15 may be of any suitable type. Preferably the relay is made of a plurality of stacked members 23, 24 and 25 formed with the air conduits of the relay, which members are suitably connected, as by corner bolts 26, 27, 28 and 29. The lower member 25 serves as the base of the relay and is formed with a centrally positioned chamber 32, see diagrammatic FIGURE 1, into which may be threaded a valve adjustment plug 33, see the practical embodiment FIGURES 2 and 4, for varying the setting of the valve spring 34 of a valve 35. This valve as shown in diagrammatic FIGURE 1 admits the main air input into chamber 32 by conduit 37 and feeds into the superimposed branch pressure chamber 38, which supplies the branch air from output 39 to any suitable pneumatic motor or the like, not shown, to be controlled. The valve 35 is double acting and includes an extension 41, which coacts with a button-like exhaust valve 42 formed with an axial bore 43 with lateral exhaust openings 44. The lower peripheral rim of the bore is defined by a seat portion 45 engageable with the valve extension. The exhaust valve 42 is secured by a washer 47 to a diaphragm 48 clamped between the intermediate ring member 24 and the top of the lower member or base 25 and is mounted in thrust relation with the top surface of the exhaust valve 42 and clamped between the top of ring 24 and the bottom of top member 23 is a second diaphragm 50, which serves as the top wall of the exhaust chamber 49 and the bottom wall of a control or pilot chamber 51.

Now with reference to practical embodiment one illustrated in FIGURES 2 through 7, the top of the pilot chamber 51 is formed from the member 23, which comprises a plate, the under face of which is centrally bored to provide a countersunk portion 52, and exterior upper face extending into collar 22 for mounting the electrical portion of the electro-pneumatic transducer unit. The countersunk portion in plate 23 is formed with a lateral conduit or second supply line 53, which mounts a suitable restrictor 54 (see FIGURE 1), which supplies air at less capacity than is discharged at the leakport nipple 55 and the coupled leakport hereinafter described leading from control chamber 51. The restrictor 54 may be a manually controlled needle valve or the like, see FIGURE 1. Also, the plate 23 from the countersunk portion 52 thereof is formed with said upstanding hollow nipple 55 within the confines of collar 22, see FIGURE 2. This nipple 55 may be coupled to a flexible tube 56, which tube curves around the bore 20 of collar 22 and couples to a hollow elongated bushing 58 mounted in a bracket 57 with a set screw 56ᵃ secured to the inner face of the galvanometer or torque motor support, see FIG- URES 2, 3 and 5. The bushing extends laterally from the bracket 57 and terminates adjacent the vane 14 of the U-shaped arm 13 laterally secured to a shaft from the moving coil 11 of the galvanometer or motor 10. The free extended end of the bushing 58 is tapered as shown at 59 adjacent the vane 14 of the arm 13 and serves as the leakport of the assembled unit, to provide proportional modulation desired by the action of the vane 14 over the leakport connected to nipple 55 of the control chamber 51 to the branch pressure chamber 38 and the branch air output 39.

*Operation*

Figure 2:
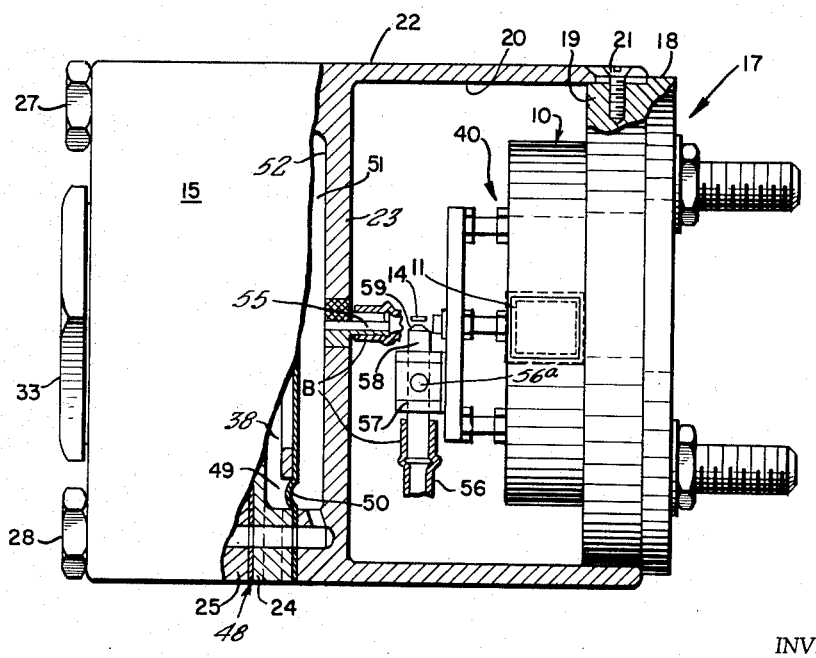
FIGURE 2 is an assembled view of a practical embodiment of the present novel electrical-pneumatic transducer partly in cross section of the complete unit.
Figure 3:
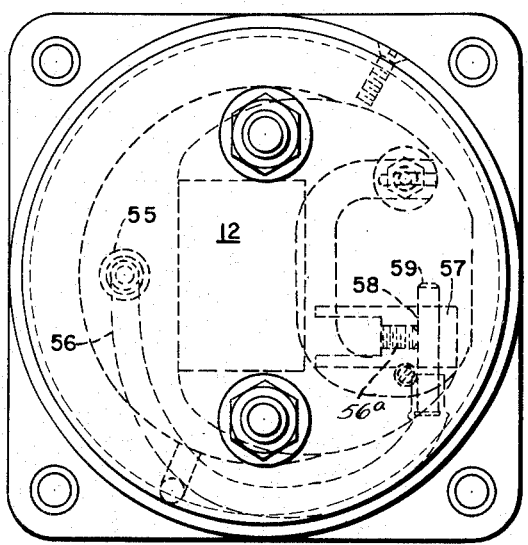
FIGURE 3 is an end elevation view of the electric motor supporting end of the unit adapted to fit in the unit casing.
Figure 6:
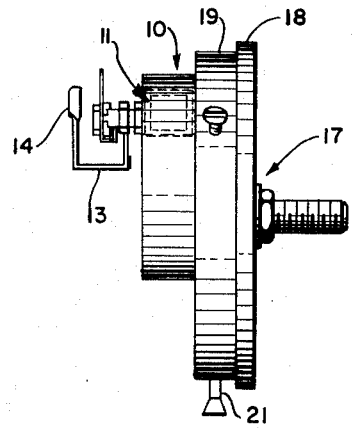
FIGURE 6 is a side view of the torque motor, the mounting bore therefor, and the leakport arm secured to the moving coil of the motor.

Assuming the present electric-pneumatic transducer unit is to be used to control a pneumatic motor or the like, see FIGURES 1 and 2, the branch pressure output is suitably connected thereto, while the torque motor or galvanometer 10 is suitably connected electrically.

The unit parts of the electric-pneumatic transducer are operatively coupled to the pneumatic relay's collar 22, so the leakport arm or lever 13 will swing the vane 14 counterclockwise or clockwise with respect to the leakport 59 held adjustably in bracket 57 by set screw 56ª. For example, as current is increased or decreased in the motor, the coil 11 is caused to move angularly. In one instance an increase in current will cause the coil 11 to move angularly in a counterclockwise direction. This movement of the coil causes the vane 14 on the leakport lever 13 to swing closer to the leakport 59, thereby restricting the air flow from the leakport and causing an increase in the pressure of control chamber 51.

This increase of pressure of chamber 51 causes thrust through diaphragm 50 to the exhaust valve 42 to move the same downward into sealing position on the valve extension 41, thereby closing the exhaust port from its open position shown in FIGURE 1. Further increase in the pressure of chamber 51 will cause the exhaust valve 42 to force the valve body 35 down against the action of the spring 34, thereby opening the branch chamber 38 to main supply air pressure from chamber 32.

The main air flow through the valve into the branch chamber 38 will increase the branch pressure and the air output to the controlled device. This increased branch pressure will act against the diaphragm 48, raising the exhaust valve 42 until the branch pressure is equal to the pressure in the control chamber 51 and the exhaust valve 42 again becomes seated.

When the current is decreased in the motor 10, the movable coil 11 is caused to move angularly in a clockwise direction, thereby moving the leakport lever 13 and vane 14 farther away from the leakport 59 of FIGURE 2. This provides a reduction in the pressure of control chamber 51 and this lower pressure permits the branch pressure under the diaphragm 48 in chamber 38 to force the exhaust valve 42 upward, thereby opening the exhaust valve, until the branch pressure in chamber 38 again equals the pressure in control or pilot chamber 51.

Thus, as the current fluctuates in the electric measuring means, the leakport lever 13 with vane 14 will move toward or away from the leakport 59, thereby causing proportional modulation of the branch output pressure to the controlled device.

Also, the relative positions of the field coil and the magnet of the galvanometer may be interchanged, if desired, whereby the magnet is movable with the vane 14 attached thereto rather than the coil to accomplish the results of the device.

Figure 8:
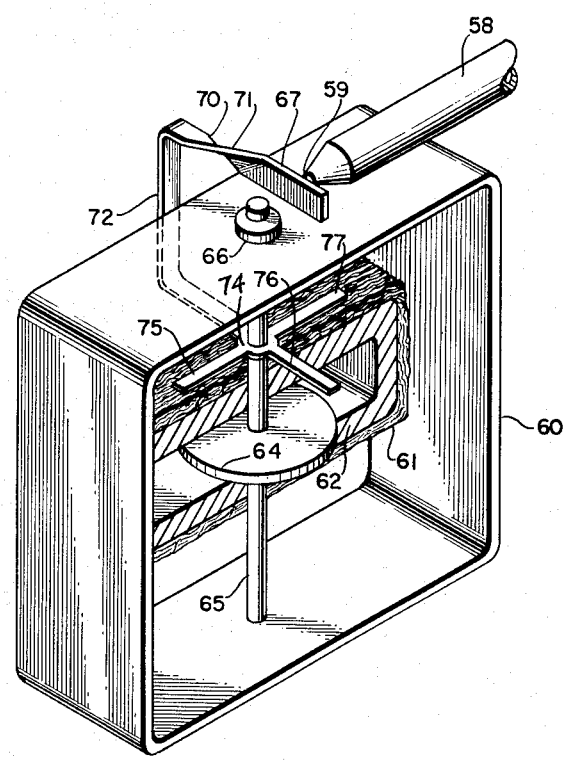
FIGURE 8 is a view in perspective of a second embodiment of electrical means, wherein the device includes a fixed coil and a movable magnet.

For example, in the embodiment illustrated in FIGURE 8 of the drawings there is disclosed a mounting frame 60, which supports a fixed winding or coil 61 wrapped or coiled around a hollow core 62.

The hollow core 62 preferably defines a rectangular opening 63 in which is confined a movable permanent magnet 64. The magnet is fixed to an intermediate portion of a rotatable shaft 65, which is suitably journalled in bearing means, such as 66, shown at the top of FIGURE 8.

The same leakport arrangement 58 and 59 is provided with the second embodiment as in FIGURE 2, for example, and a leakport vane 67 moves to and from the leakport 59 to control operation of the unit according to current fluctuations in the electric measuring means of FIGURE 8. The vane 67 extends from a twisted section 71 of a leg 70 of a U-shaped bracket 72, the other leg 73 of which extends into the frame 60 above the fixed coil 61. The end of the leg 73 is enlarged and formed with an eyelet 74 and secured to the rotatable magnet supporting shaft 65.

If desired, the eyelet 74 may be provided with radial counter-balancing arms 75, 76 and 77.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will not likely appear to others and those skilled in the art. For a definition of the scope or limits of the invention, reference should be had to the appended claims.

What is claimed is:

1. Means for proportionally modulating the controlling output of a pneumatic relay with a leakport comprising an electric current measuring means, said means comprising a moving coil galvanometer, said galvanometer having the moving coil thereof turnable in one direction upon an increase in current therein and turnable in a second reverse direction upon a decrease in current therein, a U-shaped arm secured to said coil by one leg thereof, said opposite leg being free and movable with said coil, and a valve vane on the end of said opposite free leg of the arm controlling a leakport and the output pressure of a pneumatic relay.

2. A torque motor with a movable magnetic rotor for a pneumatic relay with a leakport, a frame including a rotatable shaft journalled therein, said shaft supporting said magnetic rotor for movement therewith, a hollow core mounted in said frame, said rotor shaft extending therethrough and said magnetic rotor being mounted on an intermediate portion of said shaft in the confines of said hollow core, a coil wrapped around said hollow core, a valve arm secured to said shaft above said coil, said valve arm including a vane connected to a portion thereof and extending over the top of said frame for movement to and from the leakport of a pneumatic relay mounted adjacent thereto.

3. A torque motor with a movable magnetic rotor, a frame including a rotatable shaft journalled therein, said shaft supporting said magnetic rotor for movement therewith, a hollow core mounted in said frame, said rotor shaft extending therethrough and said magnetic rotor being mounted on an intermediate portion of said shaft in the confines of said hollow core, a coil wrapped around said hollow core, a valve arm secured to said shaft above said coil, said valve arm including a vane connected to a portion thereof and extending over the top of said frame for movement to and from the leakport of a pneumatic unit mounted adjacent thereto, said valve arm being U-shaped and having upper and lower vertically spaced legs, said lower leg being movable with said rotatable shaft and said upper leg being twisted to form a vane at substantially right angles to said upper leg, whereby said vane controls the operation of a pneumatic unit.

4. A torque motor as described in claim 3, wherein said lower leg includes movable radial arms extending from the axis of said rotatable shaft.

5. A galvanometer comprising support means, a magnet having opposed poles on said support means, means movable between the poles in response to electric current in said means, a shaft for supporting said means, said means including the said shaft, and a valve arm directly secured to said shaft, said arm being of a predetermined configuration to form a leakport valve surface connected to a portion thereof and extending from the same for movement to and from a leakport of a pneumatic relay mounted adajacent thereto.

6. A galvanometer comprising support means, a magnet having opposed poles on said support means, means movable between the poles in response to electric current therein, a shaft for supporting said means, an arm directly secured at one end to said movable means, said arm including a leakport valve surface on the end portion thereof opposite to the movable means for oscillating movement, said valve arm being U-shaped and having first and second spaced legs, said first leg being secured to said movable means and said second leg being twisted to form said valve surface on the end of said second leg, whereby said valve surface controls the operation of a pneumatic unit with a leakport adjacent to said leakport valve surface.

7. A moving coil galvanometer of high sensitivity having a flat base plate to provide a pancake formation for superimposed nested positioning in a collar surmounting a pneumatic relay casing, a valve arm of predetermined configuration secured and extending from said movable coil at one end, and a leakport vane formed on the unsecured free extended end of said arm, the casing collar enshrouding the said plate and the galvanometer in a position so the vane on said arm is movable with the coil in response to variable electric current signals in said coil to and from a suitable pneumatic relay leakport nipple from a pneumatic relay casing.

8. A moving coil galvanometer of high sensitivity having a flat base plate to provide a pancake formation for superimposed nested positioning in a collar surmounting a pneumatic relay casing, a valve arm of predetermined configuration secured and extending from said movable coil at one end and a leakport vane formed on the unsecured free extended end of said arm, the casing collar enshrouding the said plate and the galvanometer in a position so the vane on said arm is movable with the coil in response to variable electric current signals in said coil to and from a suitable pneumatic relay leakport nipple from a pneumatic relay casing, said base plate comprising a coupling portion including a reduced portion and an annular flange.

References Cited by the Examiner
UNITED STATES PATENTS

| | | | |
|---|---|---|---|
| Re. 10,802 | 1/1887 | Johnson | 236—84 |
| 2,118,248 | 5/1938 | Keinath | 236—84 |
| 2,760,509 | 8/1956 | Side | 137—82 XR |
| 2,817,213 | 12/1957 | Miner | 236—82 XR |
| 2,905,871 | 9/1959 | Martin | 317—197 |

WILLIAM F. O'DEA, *Primary Examiner.*

ISADOR WEIL, *Examiner.*